Figure 1:
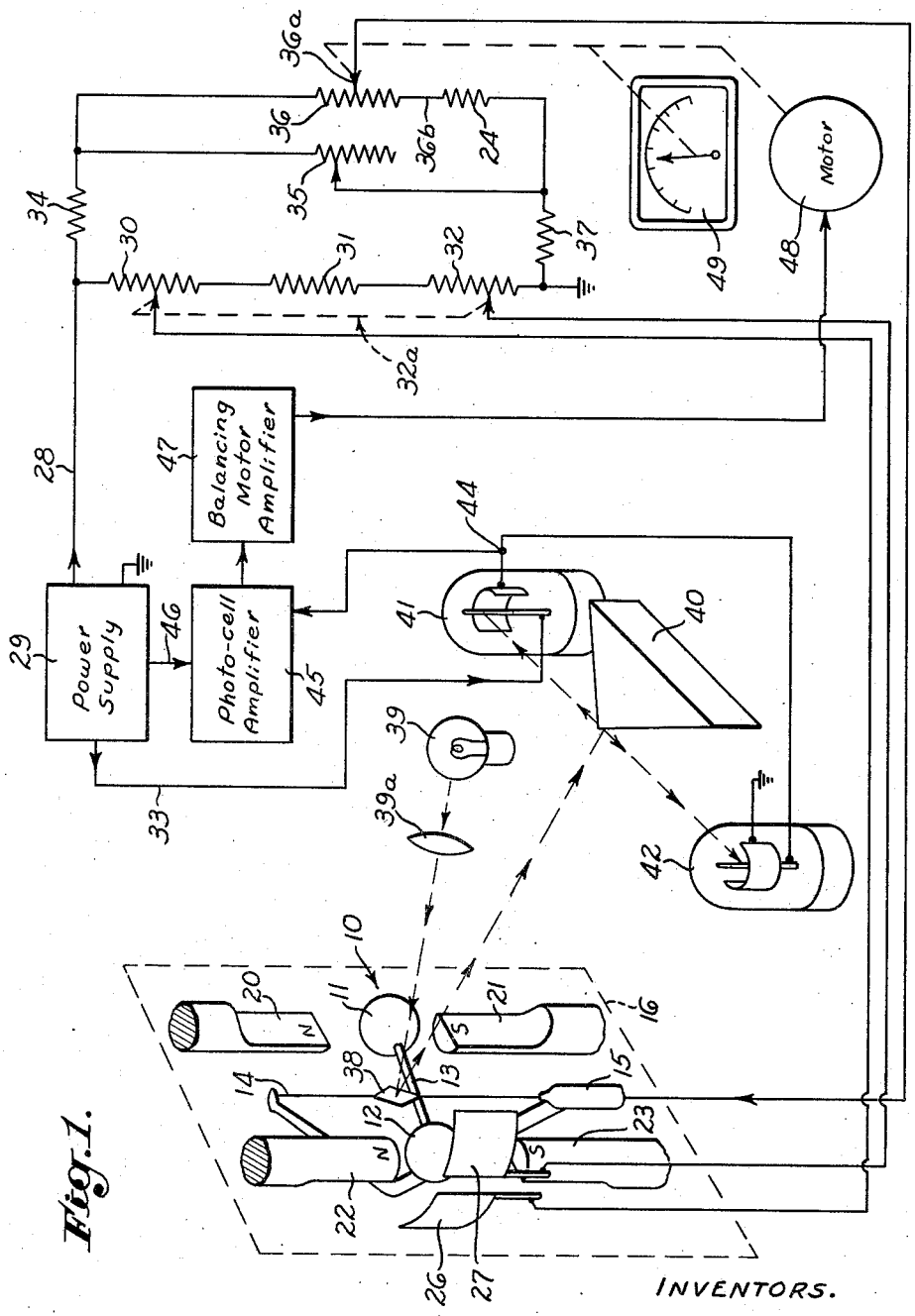

March 20, 1962

M. W. GREENE ET AL 3,026,472

NULL TYPE GAS ANALYZER

Filed Aug. 24, 1959

2 Sheets-Sheet 1

INVENTORS.
MALBONE W. GREENE
JAN W. HAAGEN-SMIT

BY THEIR ATTORNEYS.
HARRIS, KIECH, RUSSELL & KERN

INVENTORS.
MALBONE W. GREENE
JAN W. HAAGEN-SMIT
BY THEIR ATTORNEYS.
HARRIS, KIECH, RUSSELL & KERN

United States Patent Office 3,026,472
Patented Mar. 20, 1962

3,026,472
NULL TYPE GAS ANALYZER

Malbone W. Greene, Pasadena, and Jan W. Haagen-Smit, San Gabriel, Calif., assignors to Beckman Instruments, Inc., a corporation of California
Filed Aug. 24, 1959, Ser. No. 835,520
7 Claims. (Cl. 324—36)

This invention relates to gas analysis instruments of the nulling type and, in particular, to an improved construction for such instruments which substantially eliminates zero drift effects.

Instruments of this general type have a test body suspended on a pivot for exposure to the mixture to be analyzed. A change in characteristic of the gas mixture produces rotation of the test body about its pivot axis and an electric field is provided to generate a restoring electrostatic force on the test body, which restoring force opposes the rotation of the test body and maintains it at a null or zero position. The electrostatic field is also ordinarily used to initially set the test body to the zero or null point. The electric field is ordinarily provided by positioning one or more electrodes adjacent the test body and connecting appropriate electrical potentials to the electrodes. An electrical potential is also connected to the test body and the electrostatic force acting on the test body is controlled by suitably varying the potentials of the electrodes and/or test body. The characteristic of the gas mixture which instruments of this type ordinarily measure is the magnetic susceptibility or the density. The change in characteristic can be directly related to the change in composition of the mixture and the instruments ordinarily provide an output indication directly reading in percentage. A typical application of this principle to the determination of oxygen is shown in the United States patent to Pauling, No. 2,416,344, entitled Apparatus for Determining the Partial Pressure of Oxygen in a Mixture of Gases and in the United States patent to Munday, No. 2,666,893, entitled Apparatus for Measuring the Magnetic Susceptibility of Gases.

A serious problem of zero drift exists in these instruments and considerable work has been expended in attempting to overcome this difficulty. During the long period that instruments of this type have been on the market, the electronic elements thereof have been perfected to provide exceptional long-term stability and the mechanical design has been improved to eliminate effects of dimensional variations. However, the zero drift problem still exists and, accordingly, it is an object of the present invention to provide a new and improved construction for the null type gas analysis instrument which will eliminate the zero drift problem.

In the present day instruments, the test body is ordinarily of glass with a rhodium coating and the electrodes are of platinum. While various other materials have been used in constructing these elements, none has provided satisfactory results, as will be pointed out in detail below. However, it has been most unexpectedly found that the provision of a gold surface on the test body and a gold surface on the electrodes substantially eliminates the zero drift which existed in all preceding instruments. Therefore, it is a primary object of the invention to provide a null type gas analysis instrument utilizing a gold surfaced test body and gold surfaced electrodes for producing the electric field in which the test body moves. A further object is to provide such a construction which can be used with paramagnetic analyzers and density analyzers as well as with other null type instruments utilizing a moving test body and one or more zeroing electrodes.

FIG. 1 is a diagrammatic representation of a paramagnetic oxygen analyzer; and FIGS. 2, 3, 4 and 5 are performance curves of the instrument of FIG. 1.

The instrument of FIG. 1 utilizes the same principle as that of the Pauling patent, No. 2,416,344, and the construction and operation will not be described in detail herein. A test body 10 in the form of spheres 11, 12 carried at the end of a rod 13, is suspended on a quartz fiber 14 in a frame 15 in turn supported in the instrument housing 16. Magnetic pole pieces 20, 21, 22, 23 are mounted in the housing 16 above and below the spheres 11, 12, respectively, to produce the nonuniform magnetic field in which the spheres move.

Electrodes 26, 27 are mounted in the housing 16 to provide an electric field in the viciniity of the sphere 12 of the test body. One output 28 of a power supply 29 is connected across a potentiometer 30, a resistor 31 and another potentiometer 32, with the electrode 26 being connected to the arm of the potentiometer 30 and the electrode 27 connected to the arm of the potentiometer 32. The arms of the potentiometers 30, 32 are ordinarily mechancially coupled together as indicated at 32a so as to maintain a constant potential between the electrodes 26, 27 while varying the magnitude of this potential with respect to ground. The power supply output 28 is also connected across a network comprising a resistor 34, a rheostat 35 connected in parallel with a potentiometer 36 and a resistor 24, and a resistor 37. The arm 36a of the potentiometer 36 is connected to the test body for varying the potential of the test body with respect to ground and, hence, with respect to the electrodes 26, 27. The rheostat 35 provides for control of the voltage developed across the potentiometer 36 and serves as a sensitivity or scale span adjustment.

A mirror 38 carried on the fiber 14 reflects light from a lamp 39 and lens 39a to a light-dividing mirror 40, which in turn directs portions of the light beam to photocells 41, 42. Another output 43 from the power supply 29 is connected in series across the photocells 41, 42, with the point 44 between the photocells also being connected as one input to an amplifier 45. Another output 46 from the power supply serves as a reference input for the amplifier 45. The amplifier 45 drives a motor amplifier 47 which in turn drives a balancing motor 48. The balancing motor actuates an indicator 49 and also drives the arm of the potentiometer 36.

Both the electrodes and the test body have electrically conducting surfaces, the electrodes ordinarily being made of platinum and the test body of glass coated with rhodium. These materials are used because they are relatively easy to work, have high corrosion resistance, and provide smooth, continuous and permanent surfaces. With a reference gas in the instrument, the potential of the electrodes is adjusted to provide the desired output indication, ordinarily zero. Then as the paramagnetic gas content of the gas mixture in the instrument changes, the test body will tend to rotate. This rotation produces a change in the output signal from the photocells causing the balancing motor to drive the arm of the potentiometer 36 and change the potential of the test body. The system is polarized so that the change in electrostatic force acting on the test body due to this change in potential opposes the force acting on the test body due to the change in paramagnetic gas content, with the test body being maintained at the null position. The position of the arm of the potentiometer 36 and, hence, of the indicator 49 provides a measure of the quantity of paramagnetic gas present in the gas mixture.

This type of instrument is particularly adapted for measurement of oxygen content of a gas mixture since oxygen is strongly paramagnetic while most other gases are slightly diamagnetic.

Figure 2:
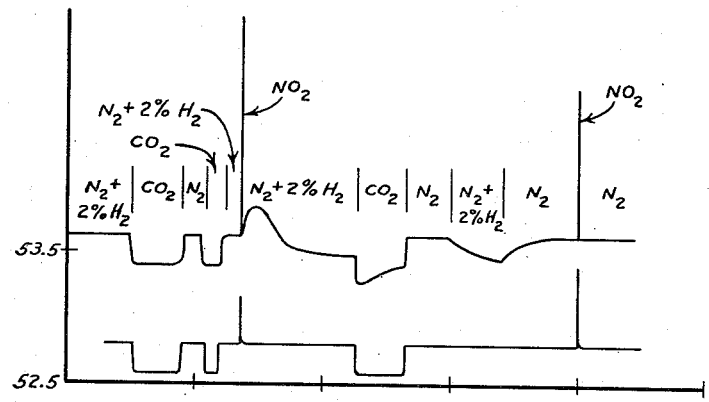

FIG. 2 shows the response of a standard Beckman Instruments, Inc. model G2 Oxygen Analyzer, which instrument is essentially as shown in FIG. 1. The tests of FIGS. 3, 4 and 5 were made on the same instrument with modification of the composition of the electrodes and test body.

In each of the curves, the abscissa is time, marked in two hour intervals and the ordinate is volts applied to the test body from the arm 36a of the potentiometer 36, which voltage measurement corresponds to the indicated output of the instrument. For the circuit of FIG. 1, this voltage normally varies from one-half of the power supply voltage (when the arm 36a is at end 36b of the potentiometer 36) to about two-thirds of the power supply voltage. Thus, in FIGS. 2 through 5, the "zero" reference voltage line is taken as 52.5 volts, which is the normal applied voltage for the zero end of the Beckman Instruments, Inc. Model G2 Oxygen Analyzer. During each test run, various gases or gas mixtures were introduced into the instrument and these samples are identified by the symbols along the upper portion of each chart; i.e., nitrogen with two percent hydrogen, carbon dioxide, pure nitrogen, and nitrogen dioxide. The introduction of pure nitrogen dioxide simulates for test purposes the operation of the instrument for several days with a small percentage of nitrogen dioxide in the sample being analyzed. The upper curve of FIG. 2 shows the output of the instrument under these test conditions while the lower curve shows the correct or desired output (the zero level was shifted for the lower curve so both could be plotted on a single graph for comparison). The difference in signal for nitrogen and carbon dioxide exists because of the difference in magnetic suspectibility of the two gases. An output of one volt corresponds to one percent oxygen in the mixture. The curve of FIG. 2 shows the usual and highly undesirable variation of null voltage with time and past operating history of the instrument.

Figure 3:
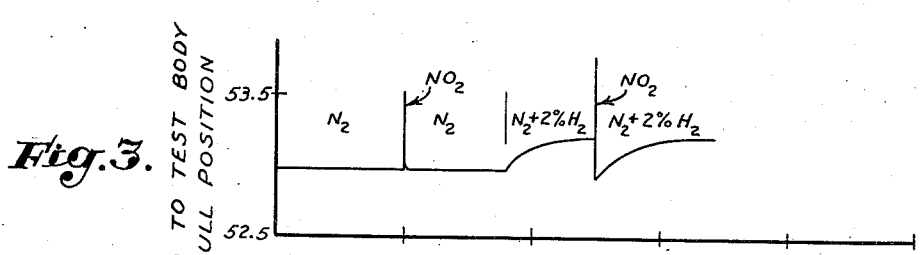

The curve of FIG. 3 was made with an uncoated glass test body and platinum electrodes and it is seen that the zero drift is different but not improved.

In another test run, the glass test body was gold plated and was operated with platinum electrodes. The test results were substantially the same as those in FIG. 3.

Figure 4:
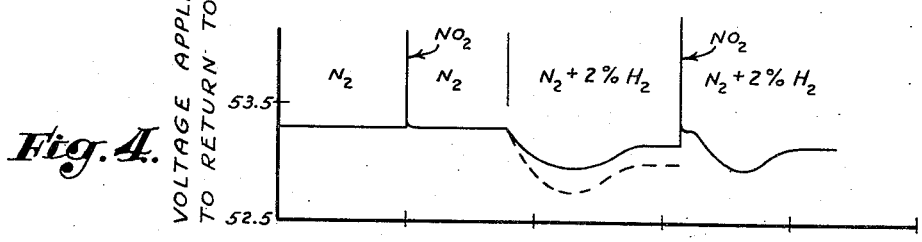

The curve of FIG. 4 was made with the test body and electrodes coated with the same material. In the solid line, rhodium was sputtered on the glass test body and on glass electrodes while in the dashed line curve, the same test body was used with rhodium sputtered on platinum electrodes. This structure also produced different but undesirable zero drift.

Figure 5:
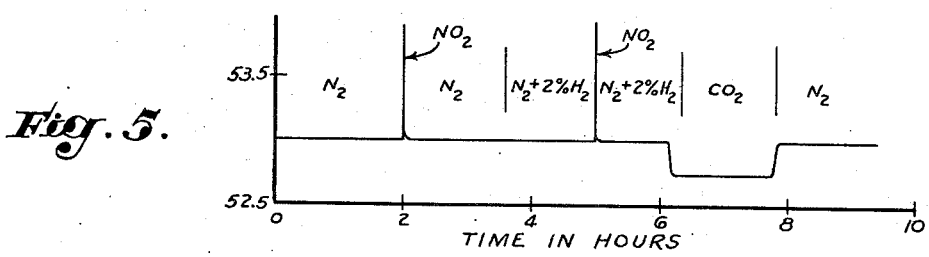

FIG. 5 shows the performance of the instrument utilizing the test body and electrodes of the present invention where both the test body and electrodes are provided with gold surfaces. The curves of FIGS. 2–5 are copied directly from records produced by the instrument during the tests and it is seen that there was no noticeable zero drift in the instrument of the invention.

It should be noted that the present invention is not limited to paramagnetic analyzers and may be used with other null type gas analyzers. For example, the invention may be used with the gas density analyzer which is very similar to the instrument shown in FIG. 1.

The instrument of FIG. 1 can be converted to a density type instrument by eliminating the magnetic pole pieces, disposing the fiber in a horizontal position so that the test body will be affected by the force of gravity, and perforating one of the glass spheres 11, 12. The instrument is zeroed or nulled as in the paramagnetic instrument, using a gas or gas mixture having a known or reference density. Then when the density of the sample gas changes, the test body will rotate, as the density of the gas within the unperforated sphere remains constant while that within the perforated sphere changes. Rotation of the test body produces an output from the amplifiers and results in a restoring electrostatic force as in the paramagnetic instrument.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a null type instrument for measuring the quantity of a particular gas present in a gas mixture wherein a pivotally mounted test body is deflected from a null position when the particular gas is present and is restored to the null position by an electrostatic force, with the restoring force being a function of the quantity of the particular gas present, the combination of: a housing; a test body having a gold surface; suspension means for suspending said test body in said housing for rotation about an axis; electrode means mounted in said housing for generating an electric field for producing an electrostatic force on said test body, said electrode means having gold surfaces; and means for detecting rotation of said test body and varying the electric potential between said test body and electrode means to oppose said rotation.

2. In a null type instrument for measuring the quantity of a particular gas present in a gas mixture wherein a pivotally mounted test body is deflected from a null position when the particular gas is present and is restored to the null position by an electrostatic force, with the restoring force being a function of the quantity of the particular gas present, the combination of: a housing; a test body having a gold surface; suspension means for suspending said test body in said housing for rotation about an axis; a pair of electrodes mounted in said housing for generating an electric field for producing an electrostatic force on said test body, said electrodes having gold surfaces; means for varying the electric potential of said electrodes to vary the electrostatic force on said test body and rotate same to a null position; and means for detecting rotation of said test body from said null position when exposed to a gas sample and varying the electric potential between said test body and electrode means to oppose said rotation.

3. In a null type instrument for measuring the quantity of a particular gas present in a gas mixture wherein a pivotally mounted test body is deflected from a null position when the particular gas is present and is restored to the null position by an electrostatic force, with the restoring force being a function of the quantity of the particular gas present, the combination of: a housing; a test body having a gold surface; suspension means for suspending said test body in said housing for rotation about an axis, said suspension means exerting a force on said test body urging said test body to a first position; a pair of electrodes mounted in said housing for generating an electric field for producing an electrostatic force on said test body, said electrodes having gold surfaces; means for varying the electric potential of said electrodes to vary the electrostatic force on said test body and rotate same to a second position which may differ from said first position; means for detecting rotation of said test body from said second position when exposed to a gas sample; and means for varying the electric potential of said test body as a function of said rotation to generate an electrostatic force opposing said rotation.

4. In a null type instrument for measuring changes in density of a gas sample wherein a pivotally mounted test body is deflected from a balanced position by the force due to gravity when the density of the sample changes and is restored to the balance position by an electrostatic force, with the restoring force being a function of the density change, the combination of: a housing; a test body having a gold surface; suspension means for suspending said test body in said housing for rotation about an axis under the influence of gravity; electrode means mounted in said housing for generating an electric field for producing an electrostatic force on said test body, said electrode means having gold surfaces; and means for detecting rotation of said test body as the density changes and varying the electric potential between said test body and electrode means to oppose said rotation.

5. In a null type instrument for measuring the quantity of a paramagnetic gas present in a gas mixture wherein a pivotally mounted test body is deflected from a null position when the paramagnetic gas is present and is restored to the null position by an electrostatic force, with the restoring force being a function of the quantity of the paramagnetic gas present, the combination of: a housing; a test body having a gold surface; means for generating a magnetic field within said housing; suspension means for suspending said test body in said magnetic field in said housing for rotation about an axis; electrode means mounted in said housing for generating an electric field for producing an electrostatic force on said test body, said electrode means having gold surfaces; means for detecting rotation of said test body out of said magnetic field when a paramagnetic gas is present; and means for varying the electric potential between said test body and said electrode means as a function of the rotation of said test body to oppose said rotation.

6. In a null type instrument using an electrostatic field for nulling a deflecting test body to provide a direct indication of the force tending to deflect the test body, the combination of: a housing; electrode means mounted in said housing for generating an electric field within said housing, said electrode means having gold surfaces; a test body having gold surfaces; means for suspending said test body in said housing in said electric field for deflection toward and away from said electrode means, with said electric field providing an electrostatic deflection force on said test body; means for detecting deflection of said test body; and means for varying the electric potential between said test body and electrode means as a function of the detected deflection to oppose said deflection.

7. In a null type instrument using an electrostatic field for nulling a deflecting test body to provide a direct indication of the force tending to deflect the test body, the combination of: a housing; a pair of electrodes mounted in said housing for generating an electric field within said housing, said electrodes having gold surfaces; a test body having gold surfaces; means for suspending said test body in said housing in said electric field for deflection relative to said electrodes, with said electric field producing an electrostatic deflection force on said test body; means for varying the electric potential of said electrodes to vary the electrostatic force on said test body and deflect said test body to a null position; means for detecting deflection of said test body; and means for varying the electric potential of said test body as a function of said deflection to vary said electrostatic force and oppose said deflection.

References Cited in the file of this patent

Chemical Industries, December 1949, page 873.

"Beckman Recording Oxygen Analyzer," Bulletin 103 of Beckman, Inc.